US009684430B1

(12) United States Patent
Perigault

(10) Patent No.: US 9,684,430 B1
(45) Date of Patent: Jun. 20, 2017

(54) LINGUISTIC AND ICON BASED MESSAGE CONVERSION FOR VIRTUAL ENVIRONMENTS AND OBJECTS

(71) Applicant: Strip Messenger, Paris (FR)

(72) Inventor: Albin Perigault, Paris (FR)

(73) Assignee: Strip Messenger, Paris (FR)

( * ) Notice: Subject to any disclaimer, the term of this patent is extended or adjusted under 35 U.S.C. 154(b) by 0 days.

(21) Appl. No.: 15/221,519

(22) Filed: Jul. 27, 2016

(51) Int. Cl.
G06F 17/21 (2006.01)
H04W 4/12 (2009.01)
G06F 3/0481 (2013.01)
G06F 17/27 (2006.01)
H04M 1/725 (2006.01)

(52) U.S. Cl.
CPC ........ G06F 3/04817 (2013.01); G06F 17/277 (2013.01); H04M 1/72552 (2013.01)

(58) Field of Classification Search
CPC ......... H04M 1/72552; H04M 1/72555; H04M 1/72569
See application file for complete search history.

(56) References Cited

U.S. PATENT DOCUMENTS

| | | | | |
|---|---|---|---|---|
| 6,990,452 | B1* | 1/2006 | Ostermann | G10L 13/00 345/473 |
| 7,669,134 | B1* | 2/2010 | Christie | G06Q 10/107 715/751 |
| 2001/0049596 | A1* | 12/2001 | Lavine | G06F 17/2785 704/9 |
| 2002/0194006 | A1* | 12/2002 | Challapali | G06T 13/40 704/276 |
| 2005/0143108 | A1* | 6/2005 | Seo | G06F 17/211 455/466 |
| 2005/0156873 | A1* | 7/2005 | Walter | H04L 51/04 345/156 |
| 2005/0261031 | A1* | 11/2005 | Seo | H04M 1/72544 455/566 |
| 2007/0266090 | A1* | 11/2007 | Len | G06F 17/211 709/204 |
| 2008/0039124 | A1* | 2/2008 | Linder | H04M 1/72544 455/466 |
| 2008/0216022 | A1* | 9/2008 | Lorch | G06F 3/04817 715/847 |
| 2010/0125785 | A1* | 5/2010 | Moore | G06F 3/04817 715/702 |

(Continued)

OTHER PUBLICATIONS iPhone J.D., "Review: Stick Texting—add funny animations to your text messages", [online] from http://www.iphonejd.com, published Aug. 2012.*

(Continued)

Primary Examiner — Jialong He
(74) Attorney, Agent, or Firm — Carr & Ferrell LLP

(57) ABSTRACT

Systems and methods that convert messages to virtual actions and behaviors of virtual objects are provided herein. An example method includes receiving a message in from a user, the message having linguistic content, performing a lexical analysis of the linguistic content to determine one or more tokens within the linguistic content, where a token includes words or phrases of the linguistic content that are indicative of an emotion, and selecting one or more expressions for an avatar of the user based on the one or more tokens present in the linguistic content.

12 Claims, 12 Drawing Sheets

(56) References Cited

U.S. PATENT DOCUMENTS

| | | | | |
|---|---|---|---|---|
| 2011/0009109 A1* | 1/2011 | Hyon | ................ | H04M 1/72544 455/418 |
| 2011/0055336 A1* | 3/2011 | Park | .................... | G06Q 10/107 709/206 |
| 2011/0294525 A1* | 12/2011 | Jonsson | .................. | G06F 17/27 455/466 |
| 2012/0059787 A1* | 3/2012 | Brown | .................. | G06F 17/241 706/52 |
| 2012/0069028 A1* | 3/2012 | Bouguerra | .............. | H04L 51/10 345/473 |
| 2012/0130717 A1* | 5/2012 | Xu | ......................... | G06T 13/40 704/258 |
| 2013/0147933 A1* | 6/2013 | Kulas | ................ | H04N 21/41407 348/61 |
| 2014/0067397 A1* | 3/2014 | Radebaugh | ............. | G10L 13/08 704/260 |
| 2014/0082520 A1* | 3/2014 | Mamoun | ........... | H04M 1/72552 715/752 |
| 2014/0161356 A1* | 6/2014 | Tesch | .................... | H04L 51/063 382/196 |
| 2015/0026620 A1* | 1/2015 | Kwon | ................. | G06F 3/04845 715/770 |
| 2015/0133176 A1* | 5/2015 | Blount | .................... | H04W 4/18 455/466 |
| 2015/0220774 A1* | 8/2015 | Ebersman | .......... | G06K 9/00308 382/118 |
| 2016/0004413 A1* | 1/2016 | Leydon | ............... | G06F 3/04842 715/838 |
| 2016/0035123 A1* | 2/2016 | Bonansea | ............... | G06T 13/80 345/473 |

OTHER PUBLICATIONS

Full Emoji Data, v3.0, "Grinning face with smiling eyes" emoji, http://unicode.org/emoji/charts/full-emoji-list.html; retrieved Aug. 30, 2016, pp. 1-74.

* cited by examiner

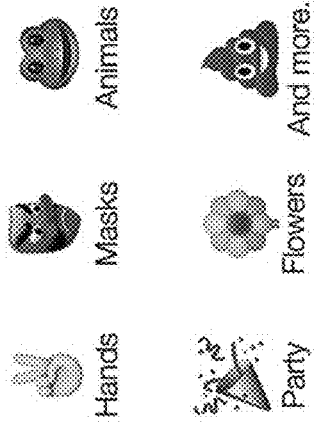
FIG. 10
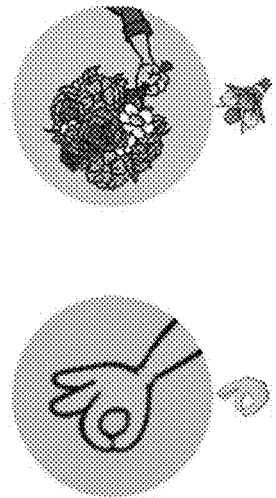
FIG. 11
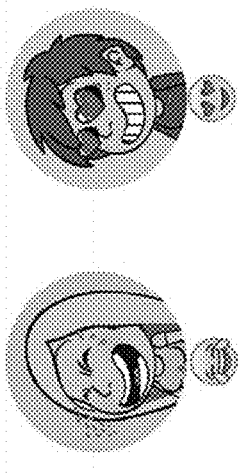
FIG. 12
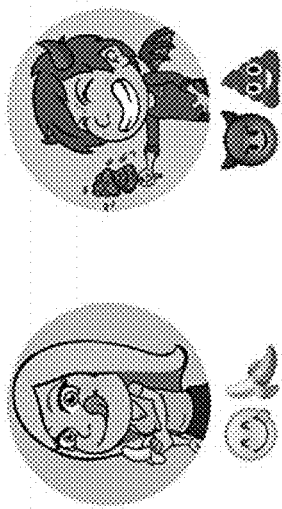

Example with emoji "😁"

- 😁 (\u1F601) triggers the emotion "Grin"

| EMOTION | TOKEN   | TYPE  |
|---------|---------|-------|
| Grin    | \u1F601 | Emote |
|         | :)      | Emote |
|         | :D      | Emote |

- "Grin" selects a combination (random weight)

| EMOTION | EXPRESSION | GESTURE     | WEIGHT | ZOOM |
|---------|------------|-------------|--------|------|
| Grin    | Grin1      |             | 10     |      |
|         | Grin2      | GrinGesture | 5      | 3    |
|         | Grin3      |             | 10     |      |

*FIG. 15*

LINGUISTIC AND ICON BASED MESSAGE CONVERSION FOR VIRTUAL ENVIRONMENTS AND OBJECTS

FIELD OF THE INVENTION

The present technology is directed to conversion of message content into virtualized representations, and more particularly, to systems and methods that interpret linguistic and emotive content (icons and images) into emotion, gesture, and graphical-based representations in virtual environments.

SUMMARY

According to some embodiments, the present technology is directed to a method comprising: (a) receiving a message in from a user, the message comprising linguistic content; (b) performing a lexical analysis of the linguistic content to determine one or more tokens within the linguistic content, wherein a token comprises words or phrases of the linguistic content that are indicative of an emotion; and (c) selecting one or more expressions for an avatar of the user based on the one or more tokens present in the linguistic content.

In some embodiments, the present disclosure is directed to a system of one or more computers which can be configured to perform particular operations or actions by virtue of having software, firmware, hardware, or a combination of them installed on the system that in operation causes or cause the system to perform the actions and/or method steps described herein. One or more computer programs can be configured to perform particular operations or actions by virtue of including instructions that, when executed by a data processing apparatus, cause the apparatus to perform the actions. One general aspect includes actions such as (a) receiving a message in from a user, the message comprising linguistic content; (b) performing a lexical analysis of the linguistic content to determine one or more tokens within the linguistic content, wherein a token comprises: (i) words or phrases of the linguistic content that are indicative of an emotion; and (ii) words or phrases of the linguistic content that are indicative of a gesture or action; and (c) selecting for an avatar: (i) one or more expressions based on the one or more tokens present in the linguistic content that are indicative of emotion; and (ii) one or more actions based on the one or more tokens present in the linguistic content that are indicative of the gesture or action.

In another embodiment, the present disclosure comprises a method, including: (a) receiving a message in from a user, the message comprising linguistic content; (b) performing a lexical analysis of the linguistic content to determine words or phrases associated with any of an emotion, an action, and a gesture; (c) locating an emoji or emoticon in the message; and (d) triggering for an avatar any of an avatar expression, an avatar action, an avatar gesture based on the presence of the words or phrases or the emoji or emoticon. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 10 illustrates the conversion of various smiley emojis into avatar expressions.

FIG. 11 illustrates the conversion of various action/gesture emojis into avatar expressions.

FIG. 12 illustrates the conversion of various emotive emojis and action/gesture emojis into corresponding avatar expressions and gestures. For example, a message comprising a smiley emoji and a banana emoji is used to produce an avatar with a happy expression and a banana in one hand.

FIG. 15 illustrates a process for converting a token associated with a "grin" emoji into attributes or characteristics for an avatar.

DETAILED DESCRIPTION

The present disclosure is generally directed to systems and methods that interpret messages comprising linguistic content and/or emoji (includes non-standard characters and Unicode extensions) content to cause the expression of emotion and/or gestures (collectively referred to as animations) by a virtual character such as an avatar.

For context, it is observed that users have difficulty to express emotions in text communications/messaging. Users rely on emoticons to express their emotions. An emoticon is a typographic display of a facial representation, used to convey emotion in a text-only medium such as: ";-)."

Users can also utilize emojis, of which there are around 1600 and more than 70 for facial expressions. Emojis are actual pictures, comprising everything from a set of painted nails (💅) to a slightly whimsical ghost (👻).

And where emoticons were invented to portray emotion in environments where nothing but basic text is available, emojis are actually extensions to the character set used by most operating systems today.

Figure 1:
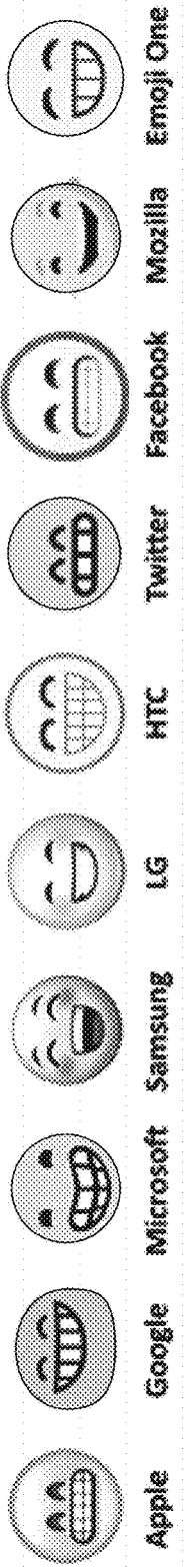
FIG. 1 illustrates a single emoji expression as generated by various device platforms, showing a lack of uniformity in expression creation.

While emojis are popular, emojis are different on each SMS/MMS or device-specific platform and can lead to misinterpretation. FIG. 1 illustrates a plurality of representations of the same emoji provided on different hardware platforms.

In a particular drawback, emojis are images/symbols that cannot be easily personalized.

The present technology is directed to systems and methods that receive messages such as SMS, MMS, email, and other messages and recognizes emotions in linguistic content, emojis, and emoticons placed in messages to offer a wide range of expressions, gestures and visual sprites around a user's custom avatar. Some embodiments provide these features as animations.

Figure 14:
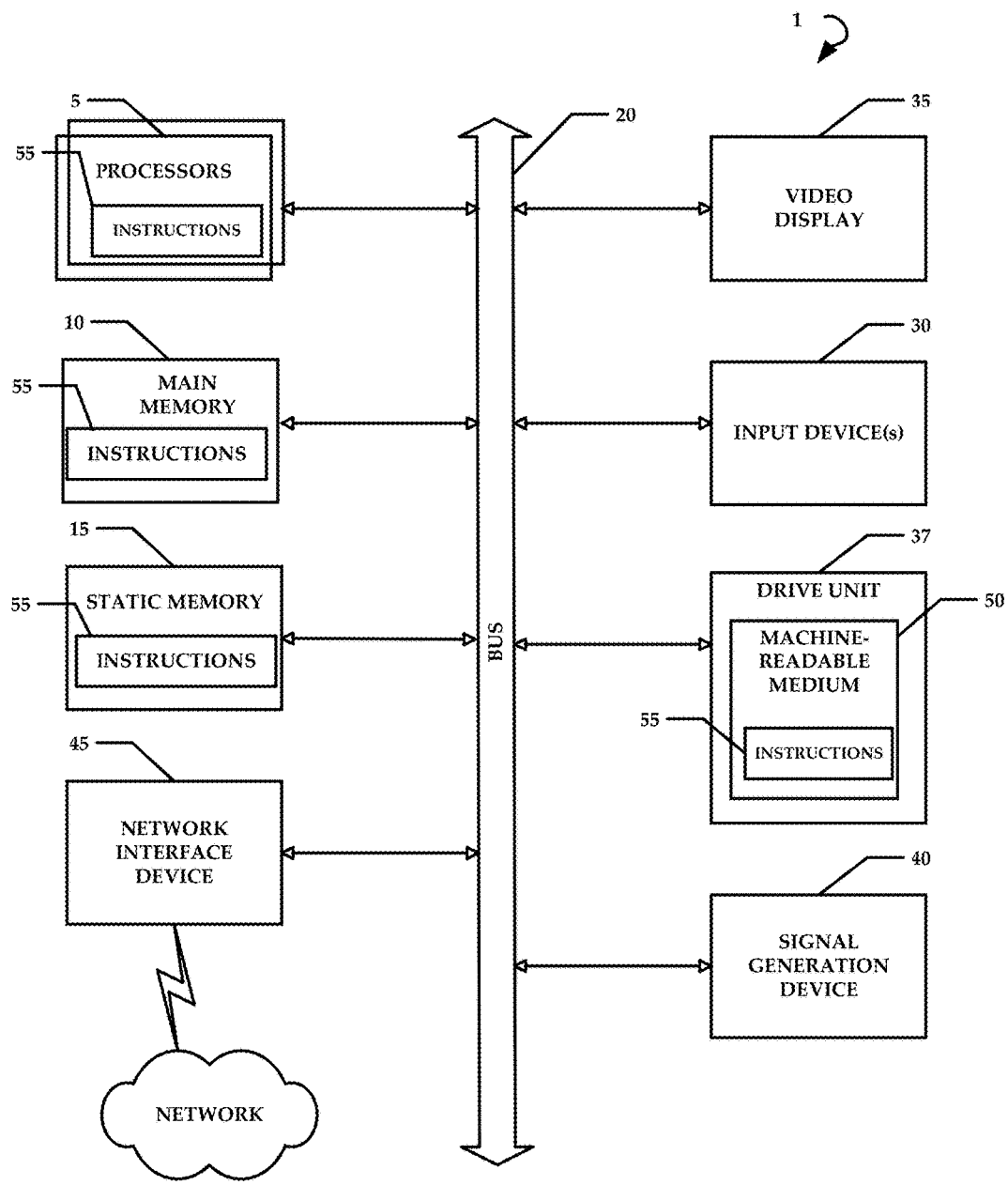
FIG. 14 is an example computing device that can be used to practice aspects of the present technology.

An example system that can be constructed to provide the message conversion methods and processes described herein is best illustrated in FIG. 14, which is described in greater detail infra. The system described herein is a specific-purpose computing device that is programmed with a lexer that converts message content into avatar expressions, actions, and can be used to change the appearance and/or clothing of the avatar. Further embodiments allow for the expression of graphix for the avatar based on message content as will be described herein.

Embodiments of the present disclosure allow for combining and triggering different types of avatar animations (comprising emotions such as facial expressions, gestures, or other actions) while being easy to understand and simple to use. A user can trigger an expression, a body gesture, a different background, a different bubble, and various other animations—just to name a few.

As mentioned above, while emojis are not represented the same way on all platforms, strip avatar expressions and gestures are the same. Thus, the conversion of emojis into gestures or expressions (emotions) of an avatar avoids confusion during communications. Thus, the systems and methods herein standardize or normalize emoji bearing communications by determining the intent or emotion of the emoji, regardless of the platform and using the intent or emotion to evoke an avatar action/animation.

The systems and methods use emotions that are related to the avatar expressions and gestures. An avatar expression is a combination of visual effects to show a facial expression. It can represent tears, smiles, and some other sprites, for example. An avatar gesture defines an avatar body position and some objects an avatar can use.

Emotions determined from linguistic content and/or emojis and emoticons can trigger one or more combinations of an avatar expression—an avatar face expression (can be null or none); an avatar gesture—an avatar body gesture (can be null or none); a statistic weight—for random weighted selection among all combinations; and a zoom value—if the emotion requires a specific zoom (can be null or none).

For context, an example rule set implemented by a system of the present disclosure is provided. In one embodiment, faces emojis ( ... ) and emotion emojis ( ... ) trigger expressions.

In another embodiment, other emojis ( ... ) trigger a gesture (or graphix). The system allows exceptions in some embodiments, for example, some emojis or combinations of emojis can trigger an expression and a gesture. A gesture emoji comprising one hand ( ... ) triggers one gesture with one hand; and repeated gesture emojis using single hands ( ... ) triggers gestures with both hands.

Table 1 below provides an example matrix of emotions, gestures, weighting, and zoom values for each extracted instance of linguistic content, emoji, and/or emoticon in a message.

TABLE 1

| EMOTION | EXPRESSION | GESTURE | WEIGHT | ZOOM |
|---------|------------|---------|--------|------|
| Grin | Grin1 | | 10 | |
| | Grin2 | GrinGesture | 5 | 3 |
| | Grin3 | | 10 | |

In one or more embodiments, the system defines a list of "Default Expressions" and "Default Gestures" used when neither expressions nor gestures are triggered in a message. These default expressions and gestures can also have a random weight. For example, default expressions show an avatar talking with a neutral expression. Default gestures show the avatar standing with random hand positions.

These defaults avoid monotony when users don't trigger any emotions for their avatar. It is desirable for avatars to use different facial expressions from time to time.

Figure 8:
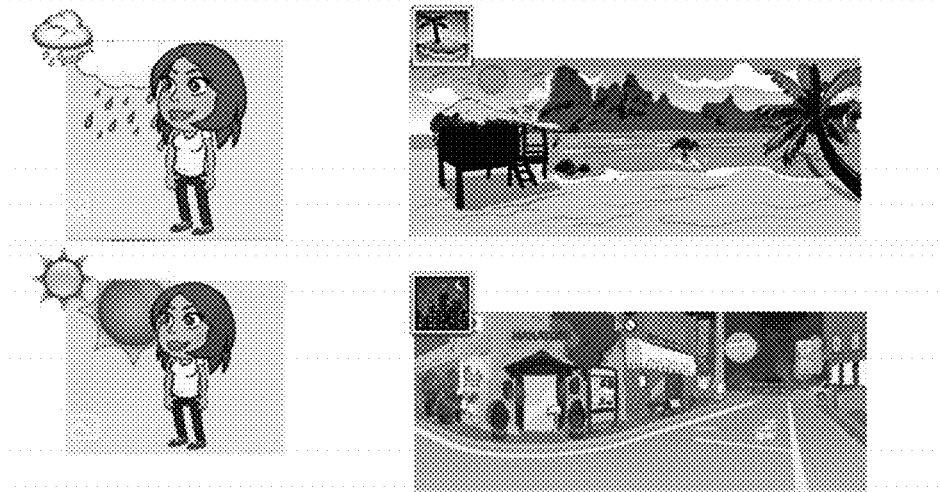
FIG. 8 is a grid comprising a plurality of independent emojis that are converted into corresponding avatar graphix.
Figure 9:
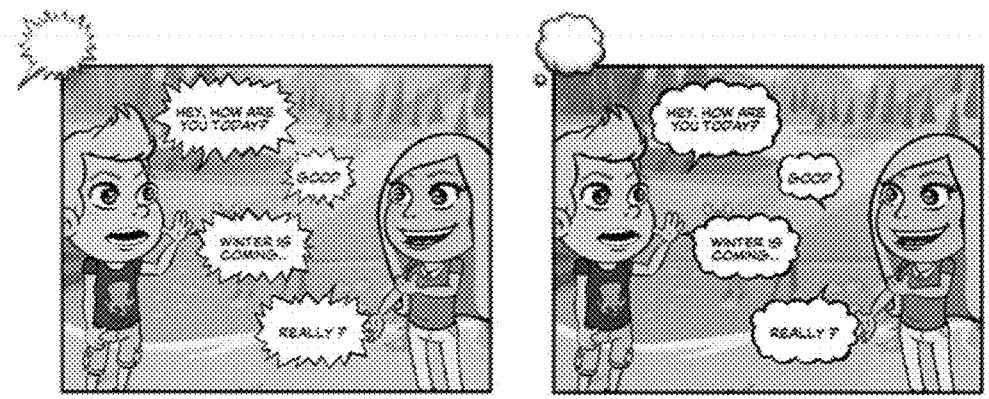
FIG. 9 is a grid comprising a plurality of independent emojis that are converted into corresponding avatar bubble types.

In some embodiments, the avatar is provided with a graphix. The system can trigger a graphix or "independent action" that can be triggered by the presence of specific types of tokens or emojis in a message. An example graphix of a weather background can be triggered when a message comprises weather emojis. For example, emojis can trigger a cloud and a sun in a background image or addition to the avatar display. Examples of weather type graphix are illustrated in FIG. 8. In another example, bubble emojis change the bubble type graphix of the message displayed above or proximate an avatar. Examples of bubble types are illustrated in FIG. 9. In another example, travel and places emojis such as trigger an appropriate background for the avatar. Other examples of graphix tokens include, but are not limited to .

As briefly mentioned above, the system can implement the use of tokens when parsing and/or evaluating messages. In one embodiment, a token comprises strings of characters triggering emotions, gestures, graphix, and various combinations thereof.

In some embodiments, tokens can have an emote type or word type. Emote tokens are accorded higher priority by the system than word type tokens. In some embodiments an emotion can be triggered by the presence of several tokens in a message. For example a plurality of tokens can be parsed from a message and then converted by the system into an avatar action such as an emotion, gesture, and/or graphix.

The system can determine that a message comprises a plurality of tokens and then group and/or prioritize the use of the tokens with respect to the avatar. Table 2 below illustrates a matrix of emotions, tokens, and types extracted from a message.

TABLE 2

| EMOTION | TOKEN | TYPE |
|---------|-------|------|
| Grin | \u1F601 | Emote |
| | ;) | Emote |
| | :D | Emote |

* \u1F601 is used for •
"grinning face with smiling eyes" emoji http://unicode.org/emoji/charts/full-emoji-list.html In one embodiment, the system implements a rule set that ensures that a single token does not trigger more than one emotion. In other embodiments, a single token can trigger a plurality of emotions and/or gestures.

Figure 2:
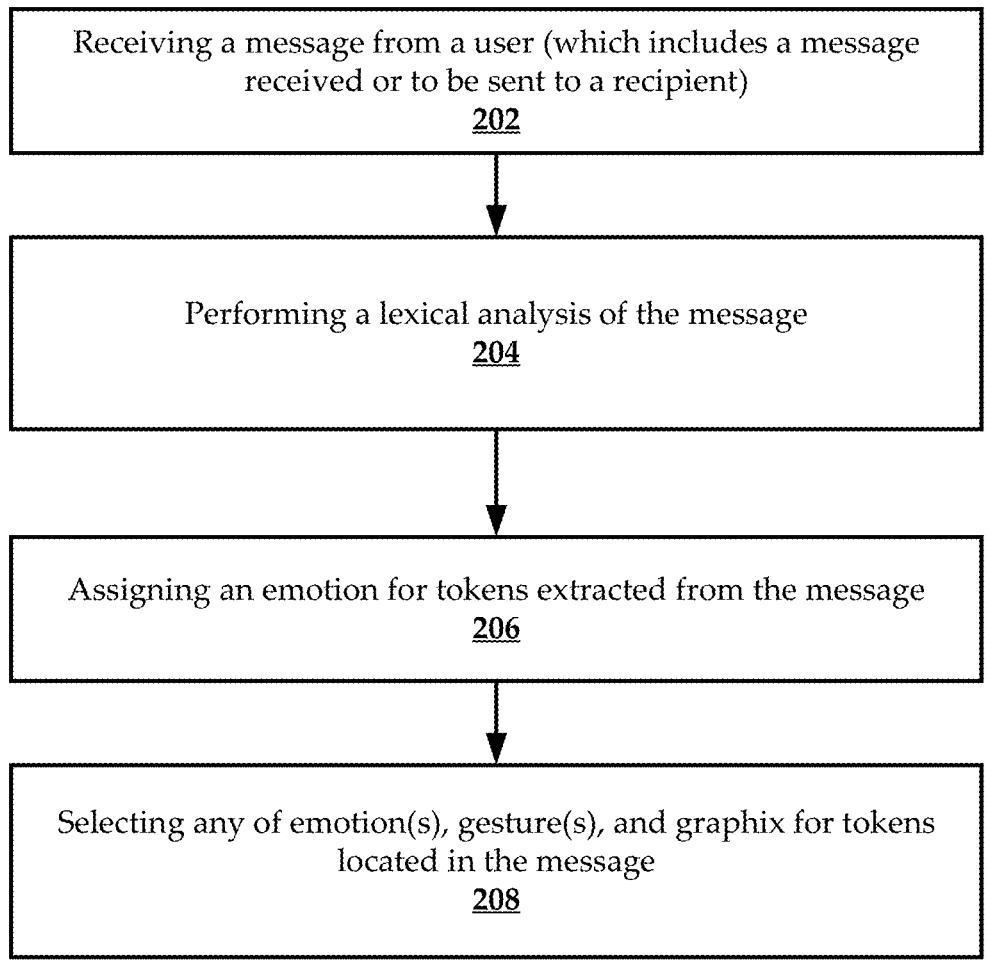
FIG. 2 is a flowchart of an example method of the present disclosure.

The following describes the use of an example algorithm by the system for processing messages and triggering any of emotions, actions (gestures), and/or graphix for an avatar of the user. FIG. 2 is a flowchart of an example message processing and conversion method. The method includes a step 202 of receiving a message from a user (which includes a message received or to be sent to a recipient). Again, this method can convert a text-based or emoji bearing message (can also include emoticons). A new message (sent or received) is received by the system.

Next, the method includes a step 204 of performing a lexical analysis of the message. In one embodiment the system uses a lexer to detect and list all "tokens" in their respective order in the message. In one embodiment, the system can list multiple tokens in the same character strings. By way of example, "LOLL" could have the token "LOL" and the token "LOLL". LOL would be a root token and LOLL would comprise an extension of the root token.

An example message comprises "Hello Cindy LOLL 😁😍 ." Using this message the system could give the following list of tokens in a table format such as in Table 3.

TABLE 3

| TOKENS  | TYPE  |
|---------|-------|
| Hello   | Word  |
| LOL     | Word  |
| LOLL    | Word  |
| U+1F601 | Emote |
| U+1F60D | Emote |

Next, the method includes the system performing an action 206 of assigning an emotion for tokens extracted from the message. By way of example, each token the system selects then selects an "emotion" (which can be randomly weighted).

Another example matrix of emotions in table form is illustrated in Table 4.

TABLE 4

| TOKENS  | TYPE  | EXPRESSION    | GESTURE | ZOOM |
|---------|-------|---------------|---------|------|
| Hello   | Word  |               | HelloGe |      |
| LOL     | Word  | LolExp        |         |      |
| LOLL    | Word  | LolExp        | LolGe   | 3    |
| U+1F601 | Emote | GrinExp       |         |      |
| U+1F60D | Emote | SmileHeartExp |         |      |

In some embodiments, the method includes a step 208 of selecting any of emotion(s), gesture(s), and graphix for tokens located in the message.

The system analyses the list to select the expression and animations for the avatar from the message with the following non-limiting list of rules: (1) Type: Emotes have a higher priority than Words; (2) Tokens of the same type (Emote and Word) placed at the end of the message have a higher priority over previous ones; (3) If a Token is selected with an Expression, the system looks for a Token with a Gesture (or Gesture first, then Expression); (4) Token with an expression and a gesture can't be broken. For example, if a token sets an expression and the following token has an expression and a gesture, it will skip it because it can't use only the gesture; (5) If no expression (or gesture) is triggered, a random expression (or gesture) is picked from the list; and (6) Each Graphix group is independent and can be filled by one trigger.

Table 5 illustrates an example matrix in table form of the various gestures, emotions (expressions for the avatar), and graphix using the applied rule set.

TABLE 5

| TOKENS  | TYPE  | EXPRESSION    | GESTURE | GRAPHIX 1 | GRAPHIX 2 | ZOOM |
|---------|-------|---------------|---------|-----------|-----------|------|
| Hello   | Word  |               | HelloGe |           |           |      |
| LOL     | Word  | LolExp        |         |           |           |      |
| LOLL    | Word  | LolExp        | LolGe   |           |           | 3    |
| U+1F601 | Emote | GrinExp       |         |           |           |      |
| U+1F60D | Emote | SmileHeartExp |         |           |           |      |

The emoji U+1F60D is last in order but first in priority, per the guidelines established above, so it sets the expression for the avatar. The LOLL linguistic phrase can't be used because it is an expression and a gesture. Thus, the system uses a token created for "hello" linguistic content to set the gesture for the avatar.

In some embodiments, the system can apply a text format when using speech bubbles with an avatar. The system can remove emote tokens such as emojis and emoticons such that only textual content of a message or a portion of a message is displayed in a speech bubble of an avatar.

Figure 3:
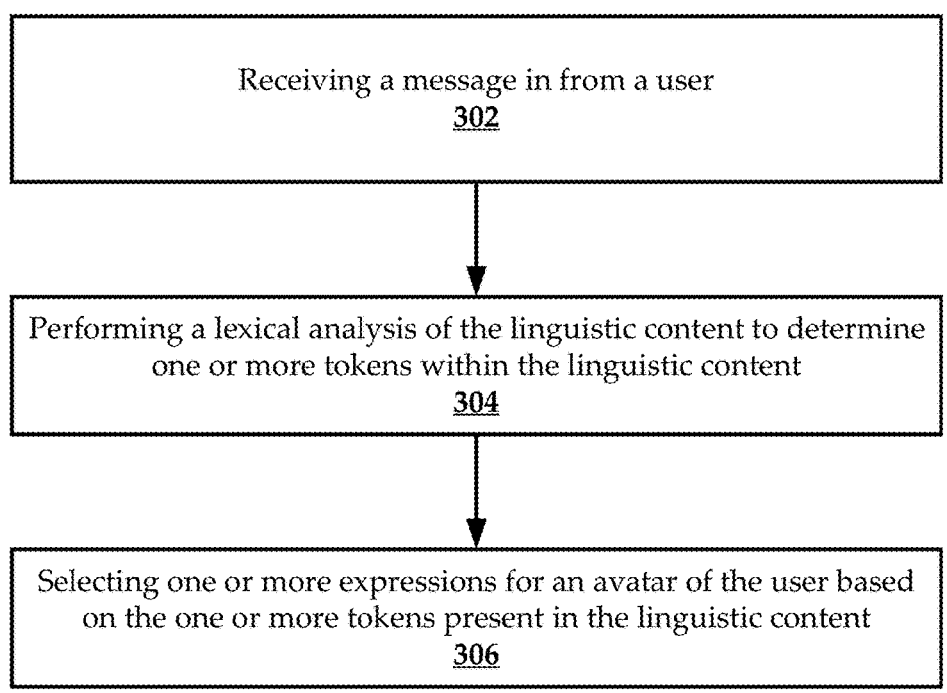
FIG. 3 is a flowchart of another example method of the present disclosure.

FIG. 3 is a flowchart of an example method of converting a message into avatar actions and expressions. The method comprises a step 302 of receiving a message in from a user. The message can comprise linguistic content such as words in a sentence. Next, the method includes a step 304 of performing a lexical analysis of the linguistic content to determine one or more tokens within the linguistic content. For example, the method step is implemented by a system that parses words and phrases in the message for emotive content such as words or phrases that denote emotions. Other types of content can also be determined such as actions (thumb up, thumb down, high-five, etc.) and independent content that can be used to apply a graphix to an avatar as defined above.

The method then includes a step 306 of selecting one or more expressions for an avatar of the user based on the one or more tokens present in the linguistic content. Some embodiments comprise creating various matrices and priorities for tokens included in the messages when a plurality of tokens are parsed from a message.

Figure 4:
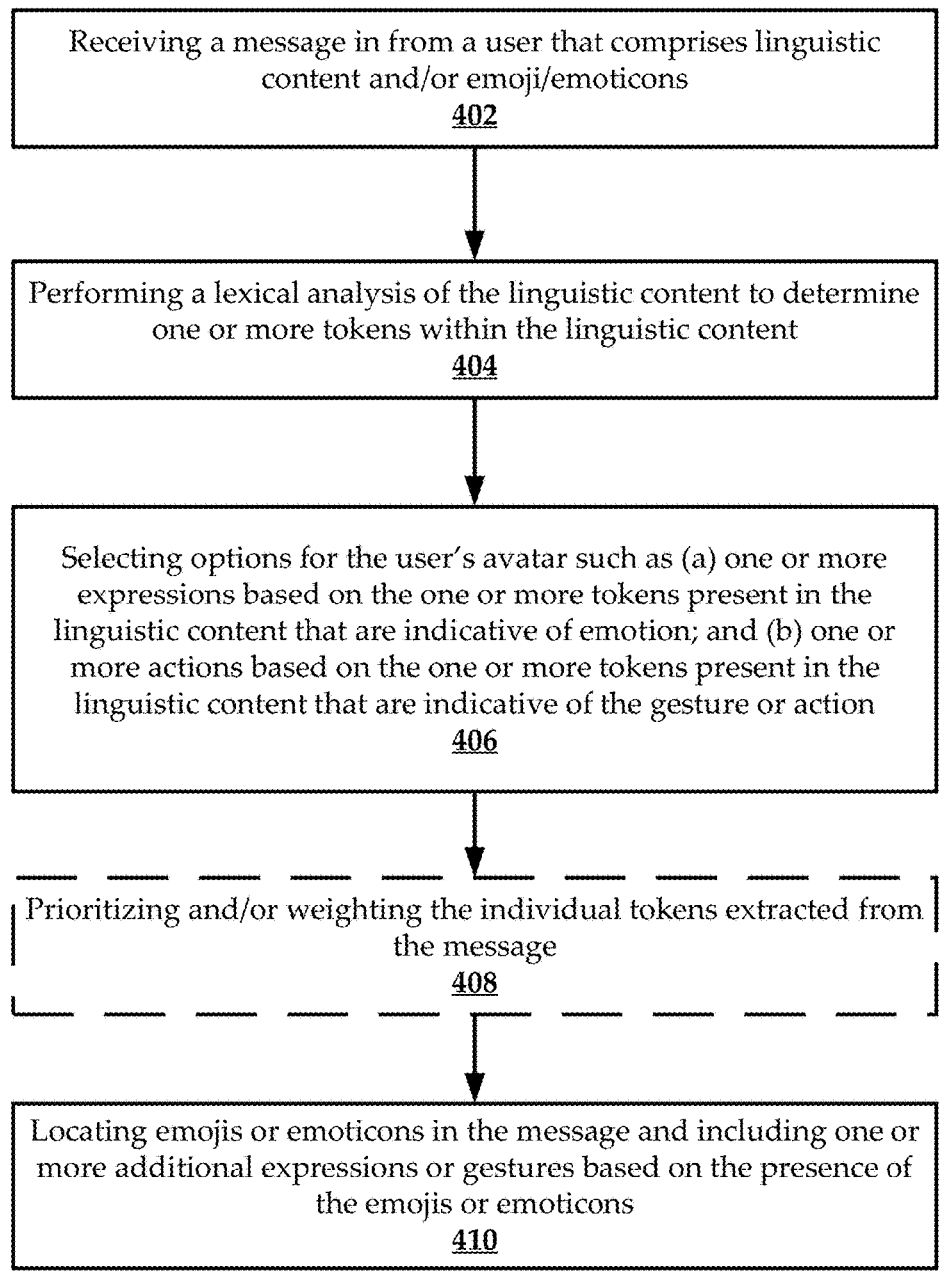
FIG. 4 is a flowchart of yet another example method of the present disclosure.

FIG. 4 is a flowchart of an example method for converting a message into avatar actions and expressions. The method includes a step 402 of receiving a message in from a user that comprises linguistic content and/or emoji/emoticons. Again, this could be any string of characters comprising textual content (other emojis and emoticons can also be present). The method includes a step 404 of performing a lexical analysis of the linguistic content to determine one or more tokens within the linguistic content. Again, a lexical analysis is examining the textual content of the message for words or phrases that are indicative of an emotion or action/gesture.

The method parses for tokens that are representative of any (a) words or phrases of the linguistic content that are indicative of an emotion; and (b) words or phrases of the linguistic content that are indicative of a gesture or action.

The method then includes the system performing an action 406 of selecting options for the user's avatar such as (a) one or more expressions based on the one or more tokens present in the linguistic content that are indicative of emotion; and (b) one or more actions based on the one or more tokens present in the linguistic content that are indicative of the gesture or action.

In one embodiment, the method includes an optional step 408 of prioritizing and/or weighting the individual tokens extracted from the message. This prioritization aids the system in triggering sequences of expressions and/or actions for the avatar (as well as potentially the use of one or more graphix).

In one embodiment, if strong words indicative of an emotion are parsed from the message, the system can cause the avatar to increase the expression of the avatar. If the word "smile" is found, the system can cause the avatar to smile. If the words "smile from ear to ear" are found, the system can cause the avatar to have a larger smile in comparison.

In another embodiment, expression of the avatar is not affected by the strength of the emotion indicated in the language of the message. According to some embodiments, a random weighting affects a magnitude of expression of the one or more expressions by the avatar. For example, a random weighting applied to words or phrases can be used to trigger unexpected or rare (such as highly expressive) facial expressions of the avatar. In most instances, the random weight will cause the system to select a standard or basic expression related to the token/words.

With respect to weighting, a component weight represents a probability compared to the sum of all weights. Probability=eight/(sum of all weights) as illustrated in Table 6 below:

TABLE 6

| DEFAULT EXPRESSIONS | WEIGHT | % |
|---|---|---|
| DE1 | 10 | 36% (=10/28) |
| DE2 | 10 | 36% |
| DE3 | 5 | 18% |
| DE4 | 3 | 11% |
| Total | 28 | | if another item is included the probabilities adjust accordingly of the new total of all weight as illustrated in Table 7 below. (With percentages only, previous values may not be adjusted accordingly)

TABLE 7

| DEFAULT EXPRESSIONS | WEIGHT | % |
|---|---|---|
| DE1 | 10 | 26% (=10/38) |
| DE2 | 10 | 26% |
| DE3 | 5 | 13% |
| DE.4 | 3 | 8% |
| DE5 | 10 | 96% |
| Total | 38 | |

The system assigns different weights for expressions/gestures, so that some expressions/gestures are more rare/unique/exclusive. With a low weight like one or two, the expressions/gestures appear much less than the others (an integer of 10 can be used as a default value). Again, strongly worded emotions cause greater expressions for the avatar.

In some embodiments, the method further comprises a step 410 of locating emojis or emoticons in the message and selecting one or more additional expressions or gestures based on the presence of the emojis or emoticons.

Referring briefly to FIG. 15, which illustrates a process of random weighting of a token, which comprises an emoji encountered in a message. When the system encounters an emoji, namely \u1F601 (GRIN), the system determines that an Emote type has been encountered. The system then selects an emotion, expression, an optional gesture, and assigns a random weight to the expression. In some embodiments, a zoom value can also be assigned. These characteristics determine the expression, gesture, zoom, and other aspect(s) for the avatar.

Figure 5:
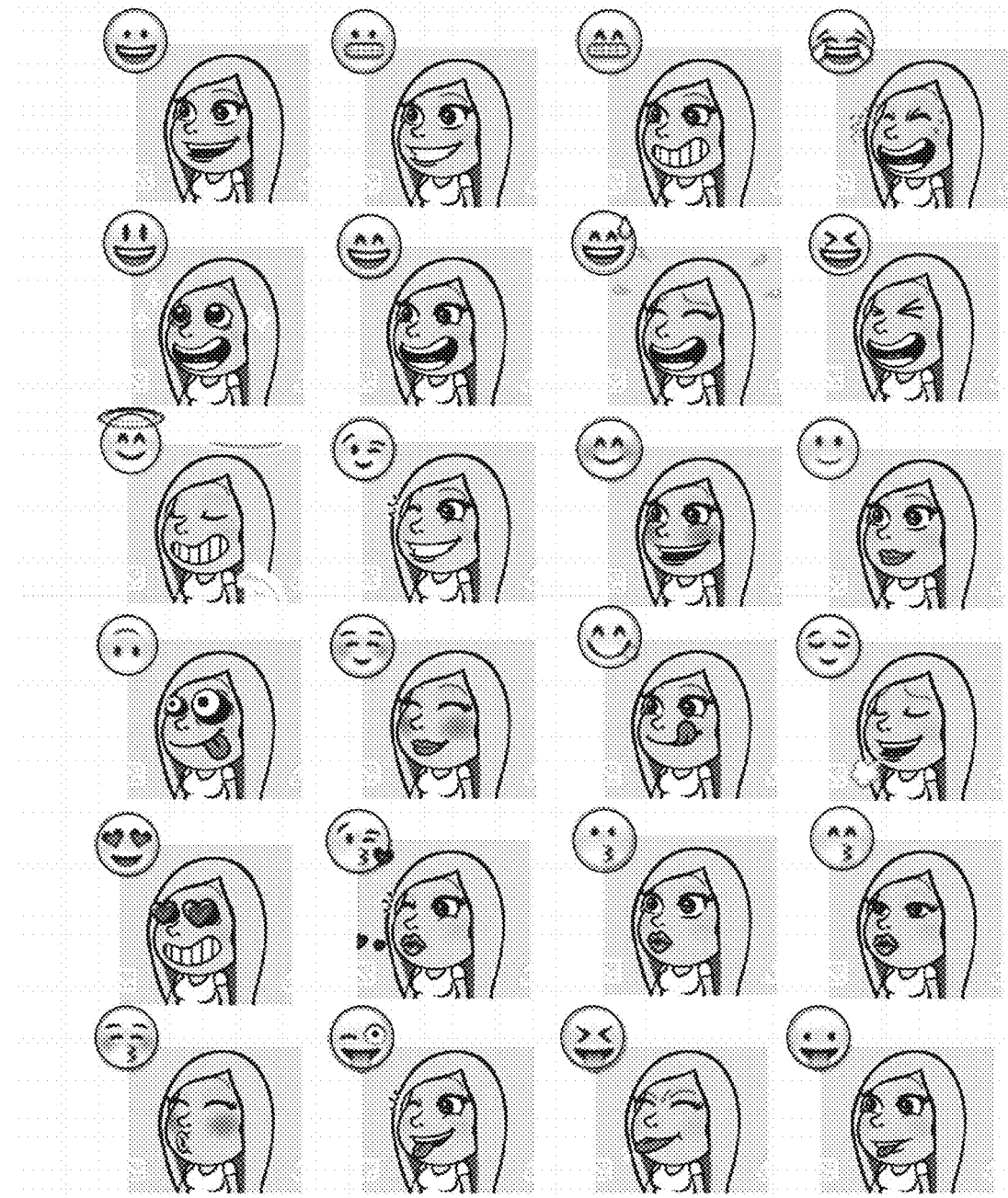
FIG. 5 is a grid comprising a plurality of emojis that are converted into corresponding avatar expressions.
Figure 6:
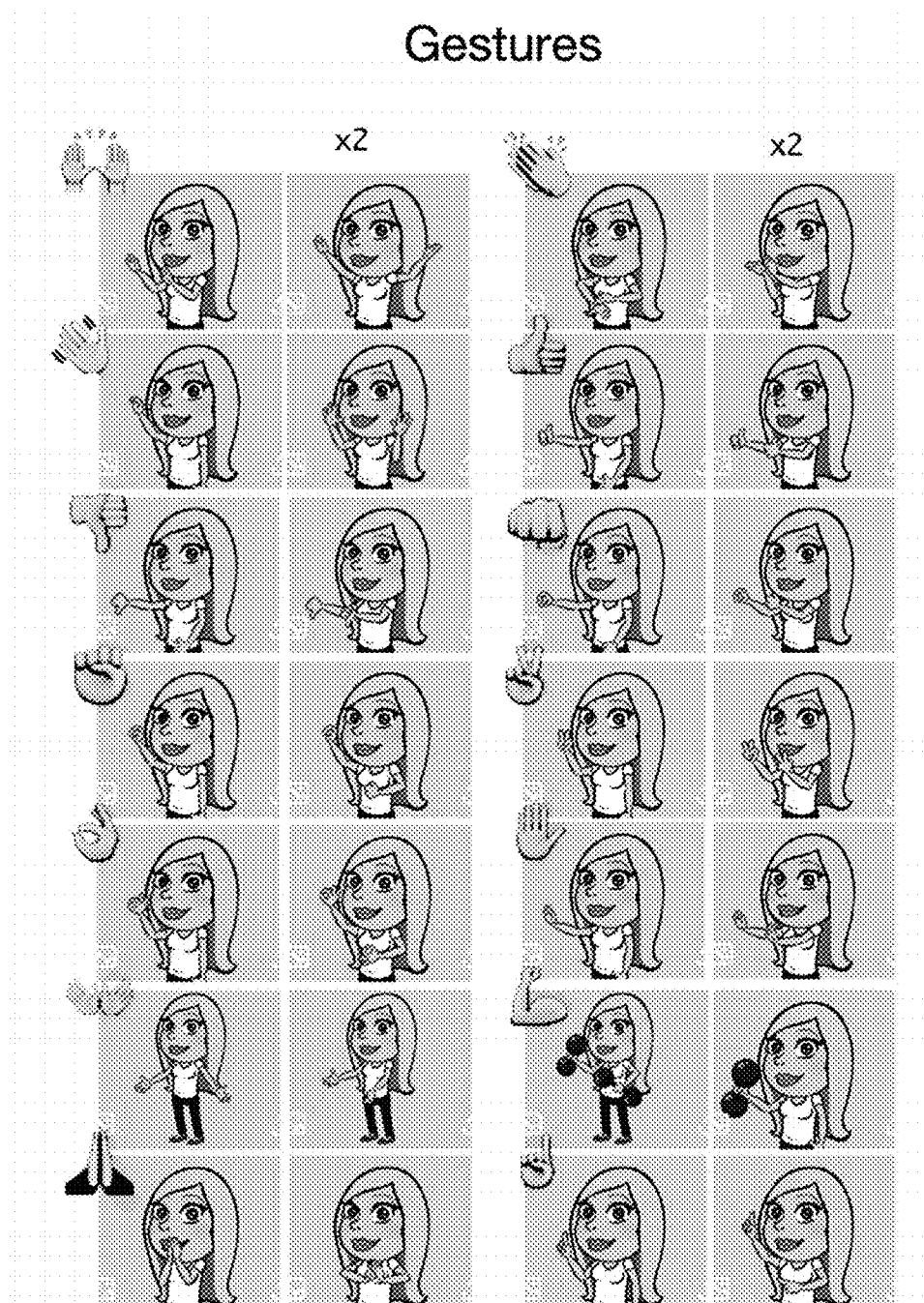
FIG. 6 is a grid comprising a plurality of gesture emojis that are converted into corresponding avatar gestures.
Figure 7:
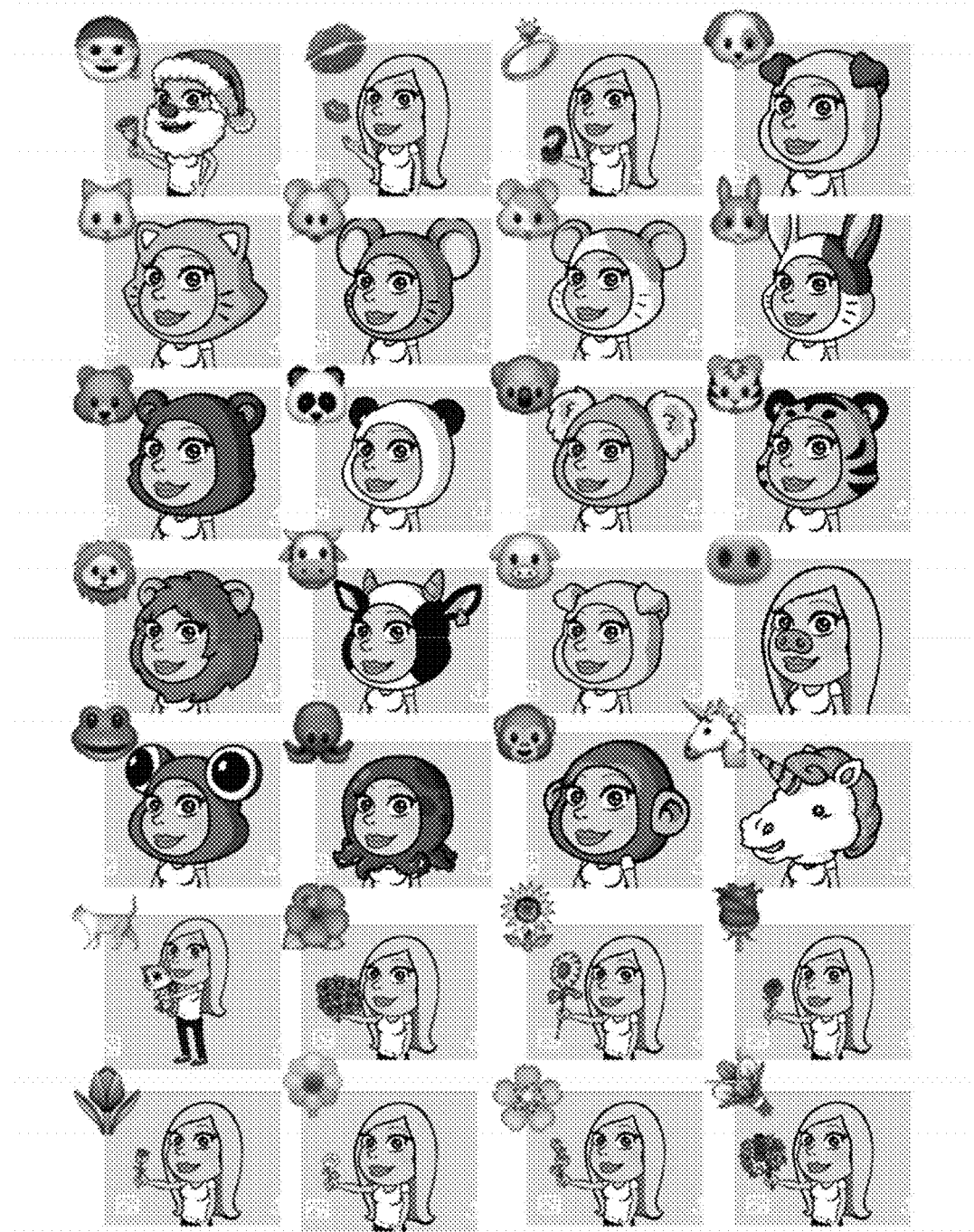
FIG. 7 is a grid comprising a plurality of additional gesture emojis that are converted into corresponding avatar gestures.

FIG. 5 is a grid comprising a plurality of emojis that are converted into corresponding avatar expressions. FIG. 6 is a grid comprising a plurality of gesture emojis that are converted into corresponding avatar gestures. FIG. 7 is a grid comprising a plurality of additional gesture emojis that are converted into corresponding avatar gestures. As can be seen, the emojis can result in costumes for avatars or other clothing and appearance related options.

FIG. 8 is a grid comprising a plurality of independent emojis that are converted into corresponding avatar graphix. FIG. 9 is a grid comprising a plurality of independent emojis that are converted into corresponding avatar bubble types.

FIG. 10 illustrates the conversion of various smiley emojis into avatar expressions. FIG. 11 illustrates the conversion of various action/gesture emojis into avatar expressions. FIG. 12 illustrates the conversion of various emotive emojis and action/gesture emojis into corresponding avatar expressions and gestures. For example, a message comprising a smiley emoji and a banana emoji is used to produce an avatar with a happy expression and a banana in one hand.

Figure 13:
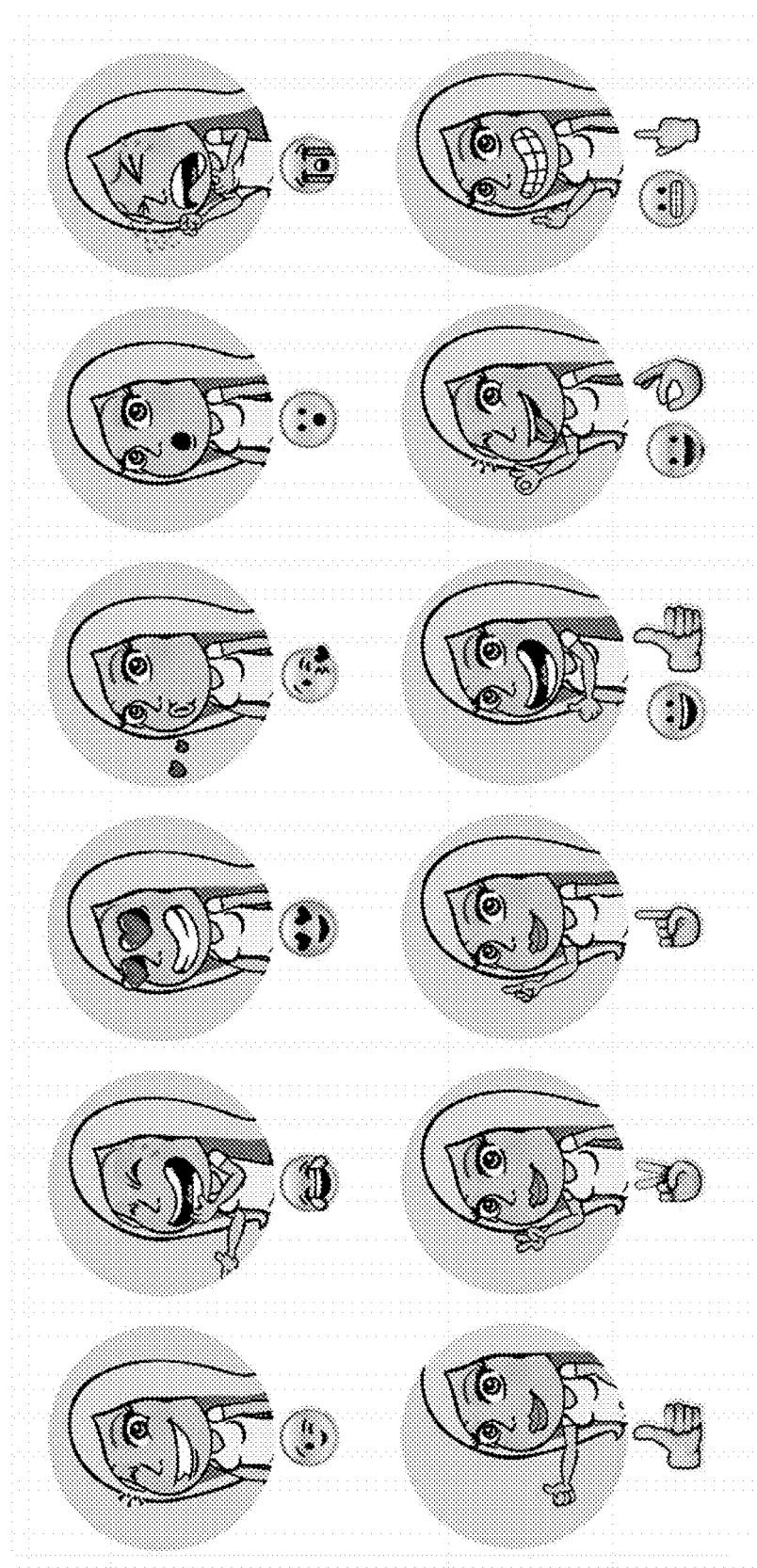
FIG. 13 illustrates a matrix of converted message content (words or emojis/emoticons) into combined avatar expressions and gestures.

FIG. 13 illustrates a matrix of converted message content (words or emojis/emoticons) into combined avatar expressions and gestures.

FIG. 14 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., alpha-numeric input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
receiving a message from a user, the message comprising linguistic content;
performing a lexical analysis of the linguistic content to determine one or more tokens within the linguistic content, wherein a token comprises words or phrases of the linguistic content that are indicative of an emotion, and wherein the one or more tokens comprise either emote types or word types, the emote types triggering a higher priority emotion than emotions triggered by the presence of the word types;
assigning a higher priority to any of the one or more tokens occurring at an end of the message;
selecting one or more facial expressions of an avatar of the user based on the one or more tokens present in the linguistic content, the selection based on the assignment of the higher priority to any of the one or more tokens occurring at the end of the message; and
displaying, on a user interface of a computing device, the avatar of the user, with the selected one or more facial expressions.

2. The method according to claim 1, wherein performing the lexical analysis of the linguistic content comprises determining one or more tokens that correspond to actions or gestures.

3. The method according to claim 2, further comprising selecting a gesture of the avatar based on the one or more tokens that correspond to actions or gestures.

4. The method according to claim 3, wherein if no tokens correspond to actions or gestures, a default gesture is selected for the avatar.

5. The method according to claim 1, further comprising determining an order of the one or more tokens, which dictates an order of selection of the one or more facial expressions.

6. The method according to claim 1, wherein the token comprises a root token and one or more additional tokens that extend the root token.

7. The method according to claim 1, wherein the one or more tokens are assigned a random weighting that causes a selection of either a basic facial expression or a rare facial expression as the one or more facial expressions by the avatar.

8. The method according to claim 1, wherein performing the lexical analysis of the linguistic content comprises determining one or more tokens that correspond to graphix content, which comprise independent context that is neither emotional nor gestural.

9. The method according to claim 8, further comprising selecting a background or environment for the avatar based on the graphix content.

10. The method according to claim 1, further comprising grouping pluralities of similar tokens together based on a similarity of emotion in the words or phrases.

11. The method according to claim 1, further comprising displaying a portion of the message in a speech bubble associated with the avatar.

12. The method according to claim 11, wherein tokens associated with the words or phrases of the linguistic content that are indicative of the emotion in the portion of the message are removed before placement of the portion into the speech bubble.

* * * * *